April 7, 1953  P. B. CARWILE  2,633,894
PLASTIC WELDING
Filed April 21, 1948  2 SHEETS—SHEET 1
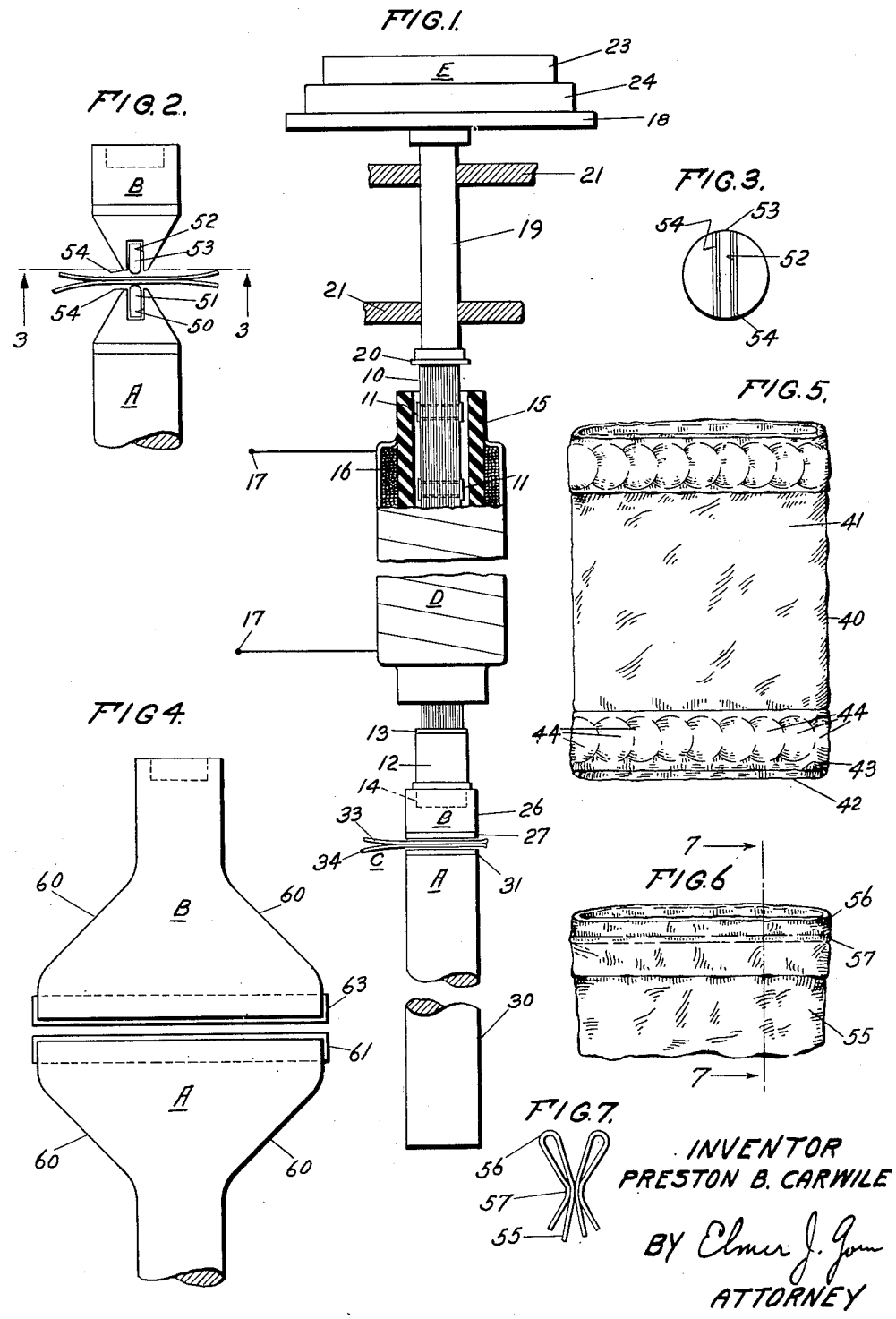
INVENTOR
PRESTON B. CARWILE
BY Elmer J. Gorn
ATTORNEY

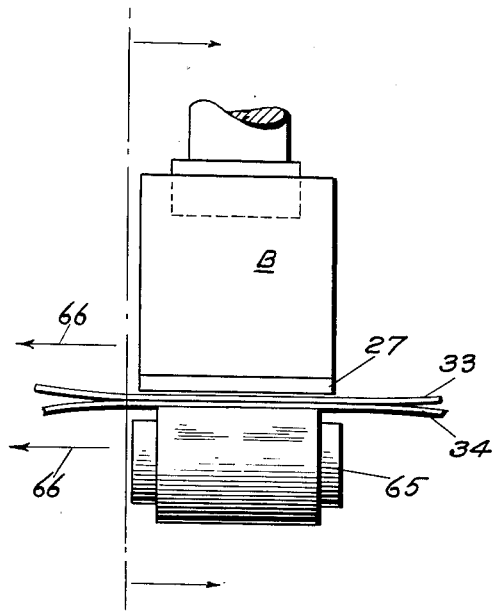
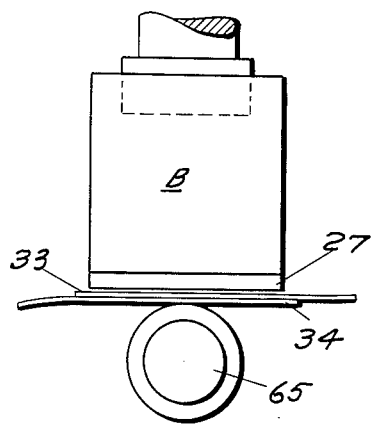
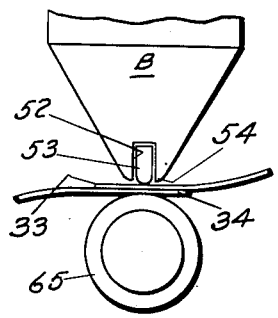
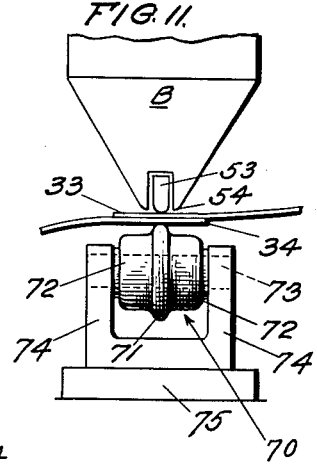
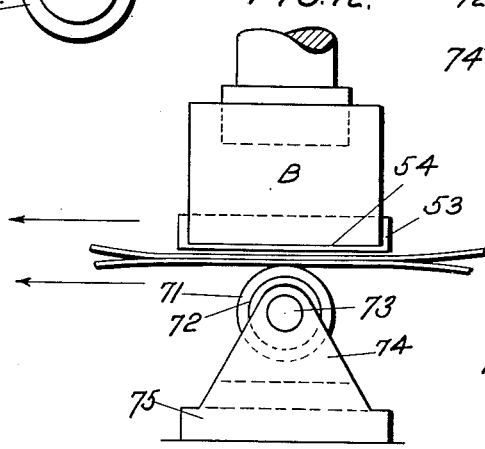

Patented Apr. 7, 1953

2,633,894

UNITED STATES PATENT OFFICE 2,633,894

PLASTIC WELDING

Preston B. Carwile, Cambridge, Mass., assignor to Raytheon Manufacturing Company, Newton, Mass., a corporation of Delaware Application April 21, 1948, Serial No. 22,368

18 Claims. (Cl. 154—42)

This invention relates in general to the fastening together or welding of pieces of thermoplastic material, and is particularly useful in welding together certain plastics which are known as "non-polar" plastics and have low electrical losses, and are not easily fastened together by known electrical heating methods. Such a non-polar plastic material is polyethylene, which is noted for its low electrical losses, and which so far as the present inventor knows can not be welded by established induction or resistance heating methods. Other materials that can be fastened together with the present invention are vinylidene chloride polymer, and vinyl chloride polymer. Polyethylene, vinylidene chloride polymer, and many similar plastics are so highly moisture proof that, especially in sheet form, they are excellent as wrappers for food products.

It is accordingly the main object of this invention to provide a method of and means for welding together pieces of thermoplastic materials, particularly in the form of thin sheets.

It is another object of the invention to provide an apparatus which will carry out such a method rapidly and conveniently, and will yield a neat and commerically suitable product.

It is another object of the invention to provide such method and means as will not damage food products contained in a container of the material that is being sealed.

It is still another object of the invention to provide such means that will consume a minimum of power, and be easy to operate.

Other and further objects and features of the invention will become apparent from the description that follows and the accompanying drawing, wherein:

Fig. 1 illustrates in vertical elevation and partly in section an apparatus for carrying out the method of the invention;

Fig. 2 illustrates an alternative set of jaws for the apparatus shown in Fig. 1;

Fig. 3 is a view taken on line 3—3 of Fig. 2;

Fig. 4 illustrates another set of jaws for the apparatus of Fig. 1;

Fig. 5 illustrates a bag prepared from sheets of polyethylene in accordance with the invention;

Fig. 6 illustrates another form of weld or fastening for sheets of plastic;

Fig. 7 is a view on line 7—7 of Fig. 6;

Fig. 8 illustrates still another set of jaws for the apparatus;

Fig. 9 is a view along 9—9 of Fig. 8;

Fig. 10 illustrates another jaw arrangement;

Fig. 11 illustrates still another jaw arrangement; and

Fig. 12 is a side view of Fig. 11.

I have found that sheets of low electrical loss plastics can be welded together by the application of oscillatory energy at a moderately low power level while under a considerable pressure at the point of weld if steps are taken substantially to prevent the loss of the heat that is developed in the plastic during the vibration thereof. When the conditions of pressure, frequency, amplitude of oscillation, and heat retentivity of the material being welded are proper, two plastic sheets can be welded together in from seven to thirty seconds, approximately, depending on the thickness of the sheets and the area of the weld. The actual welding appears to be accomplished by the heat that results from the inelastic distortions of the plastic material when it is vibrated, and the pressure that is applied aids in forcing the materials together so that the confronting surfaces apparently merge into each other. Steps are taken in practicing the invention to prevent the escape of this heat from the region in the plastic material where it is generated, and this facilitates the accomplishment of a fast and satisfactory welding operation. The method of the present invention is particularly valuable because thermoplastics generally, and polyethylene in particular, tend to stick to a hot tool, or to run when heated, so that welding by ordinary heating methods is difficult and often impossible. For example, thin sheets melt readily when heated with an iron.

Referring now to Fig. 1, there is shown an apparatus for carrying out the method of the invention. This apparatus consists mainly of a pair of jaws A and B, one above the other, between which the material C to be welded is placed. The lower jaw A is employed as an anvil and the upper jaw B as a hammer. An oscillator D drives the hammer, and a weight E placed on top of the oscillator applies constant pressure to the material C through the oscillator structure and the hammer. It will be appreciated that each of elements A, B, D, and E may take many forms. The particular details of the embodiments thereof that are illustrated in Fig. 1 will now be described.

The oscillator 1 is of the magnetostriction type, and comprises a laminated nickel rod 10 built of strips, which may each have the dimensions 0.010 inch by 0.5 inch by 10 inches, and which are fastened together in any well-known manner, for example, with flat-headed rivets 11.

A metal thimble 12 is securely fastened to the lower end of the rod 10, for example, by silver solder 13. The outer end of the thimble is threaded at 14, and the hammer B is threadedly fitted to the thimble here. A substantially rigid tube 15, which may be made of a thermosetting plastic, and supported by any auxiliary external means (not shown), surrounds the rod 10. This tube restrains the rod from lateral motion and prevents buckling, but does not interfere with longitudinal vibration. A coil 16, having, for example, several hundred turns of insulated wire, surrounds the tube. The number of turns of the coil 16 is chosen to substantially match the impedances of the source (not shown) and the load. The coil is connected at its terminals 17, 17 to a source of alternating voltage (not shown) having a frequency of approximately 7600 cycles per second, with sufficient frequency control to set the rod into strong resonant vibration in its fundamental longitudinal mode. A polarizing unidirectional current may also be furnished at the terminals 17—17, as is well known in the art.

A pan 18 is fastened to a pedestal 19 which in turn rests on the rod 10 through an elastic rubber cushion 20. This cushion is preferably made of live rubber about ¼ inch thick, and exercises substantially no damping effect on the top of the rod 10. The pedestal 19 is supported in guides 21, 21. The weight E comprising individual weights 23, 24 is placed on the pan 18.

The hammer B is made of a cylinder 26 of, for example, cold-rolled steel, which is internally threaded at its upper end to fit the threaded portion 14 of the thimble 12. A plastic face plate 27, made, for example, of a hard thermosetting plastic, is cemented to the lower face of the cylinder 26 with any convenient cement.

The anvil A comprises a rod or cylinder 30, the exact length of which is preferably adjusted to be as close as possible to one-quarter of the wavelength therein of the longitudinal mechanical vibration being employed, having a face plate 31 cemented to its upper surface confronting the hammer B. This face plate is similar to the hammer face plate 27 and is similarly fastened to the anvil. The two face plates 27 and 31 are heat insulators, and may be about $\tfrac{1}{16}''$ thick each and the plastic material to be welded, here shown as two sheets 33 and 34, is placed between them. The area of the face plates is circular, but it may be varied considerably, as will be pointed out below.

To weld two or more sheets of plastic together, the sheets are placed in the desired relation between the jaws A and B, the jaws are urged together by the weight E, and suitable alternating voltage is applied at the terminals 17, 17 of the coil 16. In experiments with polyethylene, welding was accomplished in a period of time of 7 to 30 seconds, depending on conditions such as tuning (for resonance), applied power, thickness and area of the specimen being welded, and applied pressure. The range of pressures employed was from 60 to 100 lbs. per square inch. With about 50 watts of power supplied to the coil 16, a pressure of 60 lbs. per square inch appeared to be optimum. This power was consumed at resonance when the source of power provided about 125 to 175 volts to the coil terminals 17, 17. Higher voltage caused more rapid welding.

A container that was prepared with the apparatus of Fig. 1 is shown in Fig. 5. A quantity of water 41 is contained in a polyethylene sheet bag 40. The plastic sheet was initially in the form of a section of a flabby tube, and one end, the bottom, was sealed by flattening the walls together and welding the two confronting sheets 42 and 43 together by the process of the invention in the apparatus shown in Fig. 1. The weld spots 44 are all circular in area and are overlapped so that a continuous strip of welded material is provided to close the bottom end of the tube. The bag 40 thus provided was partly filled with the water 41 and then sealed at the top in the same fashion as at the bottom. This bag has proved to be watertight and strong under conditions of ordinary handling.

The available pressure at the jaws A and B may be increased for a given weight E by providing a line contact between them, as shown in Fig. 2. There the anvil A (of which only the top of the cylinder 30 is shown) is provided with a diametric groove 50 in its top surface, and the hard thermosetting plastic face piece, in the form of a bar or strip 51 of rectangular or other suitable cross section is imbedded in the groove at one of its narrow side edges. As before, any suitable cement may be employed, or a tight fit alone may be used. The other long edge of the strip protrudes from the groove and is given a somewhat rounded cross-sectional contour so that there are no knife-like edges. This outer edge provides the face plate of the anvil. The shoulder material at the extreme top of the rod 30 on either side of the groove 50 may be cut away at the outer extremities as shown. The remainder thereof provides a mechanical stop 54 on each side of the face plate to prevent the cutting through of the material being welded. The hammer B is prepared in the same way as the anvil, having a diametric groove 52 and a strip or bar 53 of hard plastic imbedded therein, with mechanical stops 54 on each side thereof. The confronting long edges of the strip 51 and 53 provide the only operating contact with the plastic material being welded and, since a considerable reduction in contact area is thus effected, as will be appreciated from Fig. 3, the jaw pressure available from a given weight E is considerably increased. One of the benefits of this is to lessen the tendency of the rod 10 to buckle under the force of the weight E required to provide a desired pressure.

Figs. 6 and 7 show a seam that was welded with a line-faced anvil and a plane-faced hammer. The plastic tube 55 was in this case folded over at the top 59, the sheet material being very thin, of the order of 0.002 inch thick, and a series of line welds were made near the folded top edge 56 to provide a welded seam 57 in the form of a continuous line. The sectional view of Fig. 7 illustrates clearly how this was done. Obviously, while it is convenient to fold over the thinner plastic sheets as at 56 prior to welding, this is a matter of choice.

The jaws shown in Fig. 4 are a modification of those shown in Fig. 3 to provide a longer lineal contact area between them, so that a seam like the seam 57 in Fig. 6 can be welded in a single operation. Both the anvil A and the hammer B have arms 60 flared-out in the direction of the bars 61 and 63, and provided with grooves (not shown) to hold these bars. The design of these arms should be such as to preserve a uniform pressure throughout the length of the jaws when the apparatus is in operation.

Lineal contact with the material being welded can be obtained with arrangements like those shown in Figs. 8 to 12, inclusive, also. In Figs. 8 and 9, for example, the anvil A and rod 30 are replaced by a cylindrical anvil 65, which may be made of the same material as the face plate 27 of the hammer B. With this arrangement, a seam can be made between the two sheets 33 and 34 by drawing them between the jaws, for example, to the left, in the direction of the arrows 66 in Fig. 8, or toward the reader in Fig. 9. Fig. 10 is like Fig. 9 except that the hammer B of Fig. 2, having the elongated face element 53, is employed in place of the hammer of Fig. 1.

In Figs. 11 and 12, the arrangement of Fig. 10 is modified by substituting a roller-type anvil 70 for the cylinder 65. This roller has a circumferential ridge portion 71, cooperating with the elongated face element 53, and flat mechanical stop portions 72 corresponding to the mechanical stops 54 of the hammer B of Fig. 2. The roller may be made of one piece of a plastic similar to that of the face element 53 of the hammer, and is mounted to rotate on an axis that is perpendicular to the direction in which the plastic material 33, 34 is drawn. An axle 73, mounted in upstanding arms 74, 74, supports the roller 70. The arms 74, 74 are supported on a base plate 75. The material to be welded is carried between the two jaws of this arrangement with a minimum of retarding friction.

Obviously, other forms of oscillator D than the magnetostrictive form illustrated in Fig. 1 may be employed. For example, piezoelectric, electrodynamic, and electromagnetic oscillators are all well known. Likewise, pressure may be applied to the jaws A and B by other means than the weight E, such as springs, steam or air under pressure, or hydraulically, and with such means, the jaws may be arranged horizontally rather than vertically. Further, the frequency of oscillation is not a critical factor, but rather all that appears to be required is that heat be developed locally to a sufficient extent to assist in welding. In addition, heat insulation may be provided at the jaws by other materials than a thermosetting plastic. Wax paper has been used successfully, as has also a thin paper known as "fish paper." In one test, additional sheets of the plastic being welded provided the insulation. It was noted that, when an uninsulated hammer was employed to weld four thin sheets (0.002 inch thick approximately), using low power, the two sheets that were nearest to the uninsulated hammer were not welded while the two sheets next furthest removed were successfully welded. Accordingly, the claims that follow are not intended to be limited to the particular features of the embodiments shown herein, but only by the prior art.

I claim:

1. A method of fastening together pieces of thermoplastic material which comprises; grasping said pieces between a pair of jaws made of substantially heat insulating material, causing undulating distortion of said material sufficient in extent to generate heat therein, and applying an independent force continuously to urge said jaws together with sufficient pressure to merge said pieces at the interfaces.

2. A method of fastening together pieces of thermoplastic material which comprises; grasping said pieces between a pair of jaws made of substantially heat insulating material, vibrating at least one of said jaws to cause undulating distortions of said material sufficient in extent to generate heat therein, and applying an independent force continuously to urge said jaws together with sufficient pressure to merge said pieces at the interfaces.

3. A method of fastening together pieces of thermoplastic material which comprises; grasping said pieces between a pair of jaws made of substantially heat insulating material, causing undulating distortions of said material sufficient in extent to generate heat therein, and applying pressure of at least 60 pounds per square inch to said material through said jaws.

4. A method of fastening together pieces of thermoplastic material which comprises; grasping said pieces between a pair of jaws made of substantially heat insulating material, applying pressure of at least 60 pounds per square inch to said jaws, and causing undulating distortions in said material sufficient in extent to generate heat therein and for a sufficiently long time to cause said material to merge at the interfaces of said pieces.

5. A method of fastening together pieces of thermoplastic material which comprises; grasping said pieces between a pair of jaws made of substantially heat insulating material, vibrating at least one of said jaws to and from the other while maintaining said pieces at all times grasped between said jaws to cause undulating distortions of said material sufficient in extent to generate heat therein, and applying an independent force continuously to urge said jaws together with sufficient pressure to merge said pieces at the interfaces.

6. A method of fastening together pieces of thermoplastic material which comprises; grasping said pieces between a pair of jaws made of substantially heat insulating material, vibrating at least one of said jaws to and from the other at the frequency of mechanical resonance for the jaws while maintaining said pieces at all times grasped between said jaws to cause undulating distortions of said material sufficient in extent to generate heat therein, and applying an independent force continuously to urge said jaws together with sufficient pressure to merge said pieces at the interfaces.

7. Apparatus for fastening together pieces of thermoplastic material comprising; a pair of confronting substantially heat-insulating jaws wherebetween said pieces to be fastened together are disposed, means for urging continuously said jaws together, and means for vibrating at least one of said jaws.

8. Apparatus for fastening together pieces of thermoplastic material comprising; a pair of confronting jaws wherebetween said pieces to be fastened together are disposed, means for urging continuously said jaws together, means for vibrating at least one of said jaws, and heat insulating material of a sufficiently hard consistency to withstand the vibration mounted on the surface of each jaw in contact with said plastic material.

9. Apparatus for fastening together pieces of thermoplastic material comprising; a pair of confronting substantially heat-insulating jaws wherebetween said pieces to be fastened together are disposed, means for urging continuously said jaws together, and means for vibrating at least one of said jaws to and from the other without substantially separating said jaws.

10. Apparatus for fastening together pieces of thermoplastic material comprising; a pair of confronting substantially heat-insulating jaws wherebetween said pieces to be fastened together are disposed, driver means attached to one jaw for imparting thereto vibratory oscillations at a particular frequency of resonance toward and away from the other jaw, a continuous mass attached to the other jaw and extending away from the first jaw a sufficient length to provide in the second jaw assembly a wave path which is substantially an odd number of quarter-wavelengths long for waves therein at said particular frequency, and means for urging continuously said jaws together.

11. Apparatus for fastening together pieces of thermoplastic material comprising; a pair of confronting jaws wherebetween said pieces to be fastened together are disposed, driver means attached to one jaw for imparting thereto vibratory oscillations at a particular frequency of resonance toward and away from the other jaw, a continuous mass attached to the other jaw and extending away from the first jaw a sufficient length to provide in the second jaw assembly a wave path which is substantially an odd number of quarter-wavelengths long for waves therein at said particular frequency, means for urging continuously said jaws together, and heat insulating material of a sufficiently hard consistency to withstand the vibration mounted on the surface of each jaw in contact with said plastic material.

12. Apparatus for fastening together pieces of thermoplastic material comprising; a pair of confronting substantially heat-insulating jaws wherebetween said pieces to be fastened together are disposed, driver means attached to one jaw for imparting thereto vibratory oscillations at a particular frequency of resonance toward and away from the other jaw, a continuous mass attached to the other jaw and extending away from the first jaw a sufficient length to provide in the second jaw assembly a wave path which is substantially an odd number of quarter-wavelengths long for waves therein at said particular frequency, means forcefully urging continuously said jaws together, and a soft pad of sound deadening material disposed between said urging means and the jaw to which it is applied, whereby the vibration of said jaws is not interfered with by said urging means.

13. Apparatus as in claim 7 wherein said jaws are provided with similarly directed grooves in the confronting faces and said heat insulating material is a strip imbedded in each groove and protruding therefrom for its entire length, the strips of both jaws being arranged to hold the plastic material between them.

14. Apparatus as in claim 7 wherein one jaw is vibrated and the other is a roller, whereby the pieces that are to be fastened together may be carried over said roller to provide a continuous seam.

15. Apparatus as in claim 7 wherein at least one jaw is provided with a protruding portion which engages the pieces that are to be fastened together.

16. Apparatus for fastening together pieces of thermoplastic material comprising: a pair of confronting jaws wherebetween said pieces are disposed, means for urging said jaws together, means for vibrating one of said jaws, and roller means included in the other jaw confronting said one jaw whereby said pieces may be drawn over said roller means to provide a substantially continuous seam.

17. Apparatus for fastening together pieces of thermoplastic material comprising: a pair of confronting jaws wherebetween said pieces are disposed, means for urging said jaws together, means for vibrating one of said jaws, and roller means included in the other jaw confronting said one jaw whereby said pieces may be drawn over said roller means to provide a substantially continuous seam, said one jaw having a relatively narrow edge confronting said roller and said roller having a circumferential ridge confronting said edge, said pieces being disposed for fastening between said edge and said ridge.

18. Apparatus for fastening together pieces of thermoplastic material comprising: a pair of confronting jaws wherebetween said pieces are disposed, means for urging said jaws together, means for vibrating one of said jaws, and roller means included in the other jaw confronting said one jaw whereby said pieces may be drawn over said roller means to provide a substantially continuous seam, said one jaw having a relatively narrow edge confronting said roller and said roller having a circumferential ridge confronting said edge, said pieces being disposed for fastening between said edge and said ridge, the jaw and roller material adjacent said edge and ridge, respectively, being disposed to provide a stop which prevents said pieces being cut through by said edge and ridge.

PRESTON B. CARWILE.

REFERENCES CITED

The following references are of record in the file of this patent:

UNITED STATES PATENTS

| Number | Name | Date |
|---|---|---|
| 1,210,455 | Gammeter | Jan. 2, 1917 |
| 1,940,145 | Raiche | Dec. 19, 1933 |
| 2,227,497 | Hallman | Jan. 7, 1941 |
| 2,289,618 | Young | July 14, 1942 |
| 2,322,298 | Johnston | June 22, 1943 |
| 2,367,725 | Lindh | Jan. 23, 1945 |